United States Patent [19]

Doak

[11] Patent Number: 4,551,500
[45] Date of Patent: *Nov. 5, 1985

[54] BLENDS OF A RUBBER-MODIFIED VINYL CHLORIDE RESIN, AN UNMODIFIED VINYL CHLORIDE RESIN, AND A POLYMER OF A VINYL AROMATIC MONOMER AND AN UNSATURATED DICARBOXYLIC ACID ANHYDRIDE MONOMER

[76] Inventor: Kenneth W. Doak, 3469 Burnett Dr., Murrysville, Pa. 15668

[ * ] Notice: The portion of the term of this patent subsequent to Sep. 4, 2001 has been disclaimed.

[21] Appl. No.: 636,961

[22] Filed: Aug. 2, 1984

Related U.S. Application Data

[63] Continuation-in-part of Ser. No. 494,708, May 16, 1983, Pat. No. 4,469,844, and a continuation-in-part of Ser. No. 494,709, May 16, 1983, Pat. No. 4,469,845.

[51] Int. Cl.$^4$ ............................................. C08L 51/04
[52] U.S. Cl. .................................... 525/71; 525/74; 525/80; 525/84; 525/85
[58] Field of Search ..................................... 525/71, 74

[56] References Cited

U.S. PATENT DOCUMENTS

| | | | |
|---|---|---|---|
| 3,626,033 | 12/1971 | Kreskkula et al. | 525/74 |
| 3,642,949 | 2/1972 | Stafford et al. | 525/74 |
| 3,898,301 | 8/1975 | Konishi et al. | 525/74 |
| 3,925,510 | 12/1975 | Ide et al. | 525/74 |
| 4,197,376 | 4/1980 | Lee et al. | 525/74 |
| 4,269,950 | 5/1981 | Abolins et al. | 525/74 |
| 4,305,869 | 12/1981 | Lee et al. | 525/74 |
| 4,311,806 | 1/1982 | Dufour | 525/74 |
| 4,329,272 | 5/1982 | Dufour | 525/74 |
| 4,339,554 | 7/1982 | Doak | 525/74 |
| 4,454,300 | 6/1984 | Runade | 525/74 |
| 4,458,046 | 7/1984 | Hornbaker et al. | 525/434 |
| 4,469,845 | 9/1984 | Doak | 525/71 |

FOREIGN PATENT DOCUMENTS 2015007A 9/1979 United Kingdom ................ 525/74

OTHER PUBLICATIONS

Bourland et al., "More-Heat Resistant Alloys Opens up New Uses for PVC", Plastics Engineering, May 1983, p. 23.
Trementozzi, Organic Coatings & Plastics Chemistry Dio., vol. 47, p. 298, Meeting Am. Chem. Soc., Sep. 12–17, 1982.

*Primary Examiner*—Jacob Ziegler
*Attorney, Agent, or Firm*—Parmelee, Miller, Welsh & Kratz

[57] ABSTRACT

A polyblend which has high heat distortion temperature and high impact strength is produced from 80 to 20 percent by weight of vinyl chloride resins, which comprise 90 to 30 percent by weight of a rubber-modified vinyl chloride resin and 10 to 70 percent by weight of a vinyl chloride resin that is not rubber-modified; and 20 to 80 percent by weight of a polymer of a vinyl aromatic monomer such as styrene, an unsaturated dicarboxylic acid anhydride, such as maleic anhydride, and an optional third monomer such as methyl methacrylate or acrylonitrile, which polymer may be a rubber-modified polymer.

19 Claims, No Drawings

BLENDS OF A RUBBER-MODIFIED VINYL CHLORIDE RESIN, AN UNMODIFIED VINYL CHLORIDE RESIN, AND A POLYMER OF A VINYL AROMATIC MONOMER AND AN UNSATURATED DICARBOXYLIC ACID ANHYDRIDE MONOMER

CROSS-REFERENCE TO RELATED INVENTIONS

The present application is a continuation-in-part of my two co-pending applications, Ser. No. 494,708, now U.S. Pat. No. 4,469,844, and Ser. No. 494,709, now U.S. Pat. No. 4,469,845, both filed May 16, 1983, the contents of both applications being incorporated by reference herein.

BACKGROUND OF THE INVENTION

The present invention relates to blends of a rubber-modified vinyl chloride resin (PVC), prepared by polymerizing vinyl chloride in the presence of 15 to 30 percent of a rubber, with an unmodified vinyl chloride resin and a polymer of a vinyl aromatic monomer, such as styrene or p-methylstyrene, and an unsaturated dicarboxylic acid anhydride such as maleic anhydride. An optional third monomer may be used in the polymer, such as methyl methacrylate or acrylonitrile, and the polymer may also optionally contain 5 to 25 percent of a rubber grafted with a portion of the polymer. Up to 15 percent of an ungrafted rubber such as a block copolymer of 1,3-butadiene and styrene, or up to 40 percent of a graft copolymer of rubber, styrene, and methyl methacrylate or acrylonitrile may also be added to the blend.

Vinyl chloride resins have good physical properties and generally have good molding characteristics, although the use of a plasticizer and/or a high processing temperature is frequently required (U.S. Pat. No. 3,925,510). However, they have a relatively low softening temperature, e.g. 65°–75° C., and when a large amount, up to about 30 percent, of a relatively low molecular weight plasticizer is added to improve processability and flexibility, the softening temperature may be significantly reduced, e.g. to 60° C. or lower. In the past, various copolymers or terpolymers with higher softening temperatures than a vinyl chloride resin have been blended into the vinyl chloride resin in order to provide good dimensional stability at a higher temperature. The blending of copolymers or terpolymers containing a vinyl aromatic monomer and maleic anhdride, with optionally a third monomer, in order to modify the properties of a vinyl chlorde resin or a graft copolymer of styrene, acrylonitrile, and a butadiene-based rubber (ABS) has been described in various patents.

This earlier work, discussed in detail in my co-pending applications Ser. Nos. 494,708 and 494,709, describes the use of both rubber-modified and unmodified copolymers or terpolymers containing an anhydride such as maleic anhydride, however, emphasis upon use of unmodified vinyl chloride resins was made. This invention discloses the use of such vinyl chloride resins together with rubber-modified vinyl chloride resins prepared by polymerizing vinyl chloride and optional comonomer in the presence of the rubber, in order to obtain a separate rubber phase grafted with a portion of the vinyl chloride polymer. There are distinct advantages in the use of such vinyl chloride resins because of their superior processability and much higher impact strength.

U.S. Pat. No. 3,642,949 describes blends of copolymers of styrene and maleic anhydride (S/MA) with ABS graft copolymers in order to increase the softening temperature of the latter. U.S. Pat. No. 4,339,554 describes blends of rubber-modified or unmodified S/MA copolymers with unmodified vinyl chloride resins. U.S. Pat. No. 4,197,376 describes blends of rubber-modified S/MA copolymers or terpolymers containing up to 30 percent of methyl methacrylate (S/MA/MM) or acrylonitrile (S/MA/AN) with ABS resins.

U.S. Pat. No. 3,626,033 describes blends of unmodified S/MA copolymers, unmodified vinyl chloride resins, and ABS. U.S. Pat. No. 4,329,272 describes blends of unmodified S/MA copolymers, which could optionally contain up to 20 percent of methyl methacrylate or acrylonitrile, with unmodified vinyl chloride resins. The blend could optionally contain up to 40 percent of ABS or MBS (a graft copolymer of styrene, methyl methacrylate, and a butadiene-based rubber). U.S. Pat. No. 4,311,806 describes similar blends in which the maleic anhydride copolymers or terpolymers were rubber-modified.

U.S. Pat. No. 4,454,300 describes blends of a vinyl chloride-polyolefin graft (rubber-modified) copolymer with a copolymer of styrene and maleic anhydride. Preferred polyolefin elastomers were copolymers of ethylene and propylene, or terpolymers containing up to 15 percent of a diene monomer (EPDM). The copolymer could contain up to 25 percent of a third monomer such as acrylonitrile or methyl methacrylate, and could be rubber-modified. These blends exhibited higher heat distortion temperatures than those of the vinyl chloride polymers. The blends could optionally contain acrylonitrile/butadiene/styrene or methyl methacrylate/butadiene/styrene resins.

British Pat. No. 2,015,007, which is incorporated into this disclosure by reference, discloses blends of vinyl chloride resins with block copolymer rubbers of a diene and a vinyl aromatic monomer, together with up to 20 percent of an impact modifier, ABS or MBS. Blends of rubber-modified vinyl chloride resins with block copolymer rubbers were also disclosed, optionally containing ABS or MBS.

Bourland and Wambach (Plastics Engineering, May 1983, p. 23: J. Vinyl Technol., 1983, 5 (3), p. 121) disclosed that S/MA copolymers are partially miscible with vinyl chloride resins and hence, increase the softening temperature and reduce melt viscosity. Impact modifiers could be added to the blends.

Hall, Mendelson, and Trementozzi discussed the preparation of blends of various terpolymers containing maleic anhydride (S/MA/X) with random copolymers of styrene and acrylonitrile (S/AN) or ABS. (See Preprint for Organic Coatings and Plastics Chemistry Division, 47, p. 298, Meeting of the Am. Chem. Soc., Sept. 12–17, 1982).

SUMMARY OF THE INVENTION

This invention describes the preparation of new polyblends containing a rubber-modified vinyl chloride resin, having high heat distortion temperatures, high impact strength, and good processability. These blends comprise:

A. 80 to 20 percent by weight of (1) plus (2) wherein:
(1) is 90 to 30 percent of a rubber-modified vinyl chloride resin, containing 0 to 20 percent, based on total monomers, of a copolymerizable, ethylenically unsaturated comonomer, the resin prepared by polymerization of vinyl chloride monomer and the comonomer in the presence of 15 to 50 percent, based on the weight of the resin, of a rubber to form a graft copolymer; and (2) is 10 to 70 percent by weight of a vinyl chloride resin, containing 0 to 20 percent, based on total monomers, of a copolymerizable, ethylenically unsaturated comonomer.

The ethylenically unsaturated comonomer in (1) and (2) is selected from the group consisting of ethylene, propylene, isobutylene, or other alpha-olefin containing 4 to 8 carbon atoms, vinyl acetate, vinyl stearate, a vinyl alkyl ether containing 4 to 20 carbon atoms, vinylidene chloride, an alkyl acrylate, acrylic acid, methacryic acid and methyl methacrylate; and a major amount of the polymerized vinyl chloride homopolymer and copolymer present in the total amount of (1) and (2) is ungrafted to the rubber; and B. 20 to 80 percent by weight of a polymer of a vinyl aromatic monomer such as styrene or p-methylstyrene and an unsaturated dicarboxylic acid anhydride monomer, such as maleic anhydride, in weight ratios of 95:5 to 70:30, and 0 to 25 percent, based on total monomers, of a copolymerizable, ethylenically unsaturated termonomer, such as methyl methacrylate, acrylonitrile, and methacrylonitrile.

The polymer may optionally be a rubber-modified polymer containing 5 to 25 percent, based on weight of the rubber-modified polymer, of at least one rubber grafted with a portion of the polymer by polymerizing the monomers in the presence of the rubber.

To the polyblend there may be added up to 15 percent, based on weight of the polyblend, of an ungrafted rubber.

To the polyblend there may also be added up to 50 percent by weight, based on the weight of the polyblend, of a graft copolymer of 30 to 80 percent of methyl methacrylate and 70 to 20 percent of a vinyl aromatic monomer, preferably styrene or p-methylstyrene; or a graft copolymer of 20 to 40 percent of an unsaturated nitrile, such as acrylonitrile or methacrylonitrile, and 80 to 60 percent of a vinyl aromatic monomer; a portion of said copolymers being grafted onto 10 to 60 percent, based on the weight of the graft copolymer, of a substrate rubber.

DESCRIPTION OF THE INVENTION

Heretofore, the preparation of blends of vinyl chloride resins with S/MA copolymers or terpolymers (both glassy and rubber-modified) involved the use of a vinyl chloride resin which might contain various additives, including impact modifiers, high molecular weight polymeric processing acids, or a relatively large amount of low molecular weight plasticizers. (See European Patent Application No. 53,080, Dec. 1, 1982).

The use of rubber-modified vinyl chloride resins offers advantages over the use of unmodified vinyl chloride resins in blends. Rubber-modified vinyl chloride resins generally have a lower melt viscosity and better processability, as well as much higher impact strength, than the corresponding unmodified resins, and their use in blends frequently makes it easier to obtain uniform mixtures. This is particularly important when preparing impact-resistant blends by using one rubber-modified component in the blend. A blend of a rubber-modified vinyl chloride resin with an unmodified maleic anhydride polymer will generally have a more uniform distribution of dispersed graft copolymer than a blend of an unmodified vinyl chloride resin and a rubber-modified maleic anhydride polymer. If a third polymeric component is used in the polyblend, the use of the rubber-modified vinyl chloride resin is again advantageous.

The use of relatively large amounts (e.g. up to 30 percent) of a low molecular weight plasticizer such as dioctyl phthalate, will also improve the processability of vinyl chloride resins and provide easier mixing in blends. However, its use significantly reduces the softening temperature, as well as stiffness and rigidity, and hence, will adversely affect the properties of blends. Therefore, it is preferable to use little (less than 10 percent) or no plasticizer if maximum heat distortion temperatures are to be obtained. The use of up to 20 percent of a comonomer in the vinyl chloride resin will also improve processability, but will reduce softening temperatures and stiffness significantly unless a small amount, e.g. less than 10 percent, is used.

In my co-pending applications Ser. Nos. 494,708 and 494,709, there is described the use of rubber-modified vinyl chloride resins which contained 2 to 20 percent of rubber grafted with a portion of the vinyl chloride homopolymer or copolymer by polymerizing the monomers in the presence of the rubber. The present application describes the use of rubber-modified vinyl chloride resins containing 15 to 50 percent of rubber in blends with copolymers and terpolymers containing maleic anhydride, together with additional unmodified vinyl chloride resins, in order to control the amount of rubber in the total amount of vinyl chloride resins added to the polyblend.

The rubber-modified vinyl chloride resin is prepared by the polymerization of vinyl chloride in the presence of one or more rubbers. Suitable rubbers are disclosed in my co-pending applications Ser. Nos. 494,708 and 494,709. The preferred rubbers are copolymers of ethylene and up to about 50 percent of vinyl acetate, copolymers of ethylene and an alkyl acrylate in which the alkyl group contains 1 to 8 carbon atoms (particularly those alkyl acrylates in which the alkyl group is a methyl, ethyl or butyl group), chlorinated polyethylene containing 20 to 40 percent of chlorine, a terpolymer of ethylene, propylene, and a diene termonomer, and butyl acrylate-based rubbers.

The compositions of the rubbers are chosen to prevent complete compatibility with the vinyl chloride resin, but to give a good balance between compatibility and incompatability, so that the rubber (or graft copolymer) is dispersed as a separate phase, wetted by ungrafted vinyl chloride resin. The products with the lower rubber contents retain some of the characteristics of a rigid vinyl chloride resin with somewhat reduced rigidity and softening temperatures, but with enhanced impact strength. Products containing high rubber contents are generally soft and flexible and do not resemble a rigid vinyl chloride resin.

Products prepared using saturated rubbers (or those containing only a very small amount of a diene) are generally suitable for use in outdoor applications. For indoor applications, it is feasible to use unsaturated rubbers such as polybutadiene, block copolymers of butadiene and up to 55 percent of a vinyl aromatic monomer (e.g. styrene), butadiene-acrylonitrile rubber, and the like.

The preparation of rubber-modified vinyl chloride resins containing between 15 to about 50 percent of rubber has been described in various patents; some resins are available commercially (Modern Plastics, February, 1982, p. 14). The preparation of rubber-modified vinyl chloride resins (graft copolymers) containing 2 to about 20 percent of rubber was discussed in detail in my co-pending applications Ser. Nos. 494,708 and 494,709, and involved the use of bulk, suspension, and emulsion processes. The preparation of resins containing higher rubber contents has also been described. A graft copolymer of vinyl chloride resin containing 50 percent of ethylene-vinyl acetate (E/VA) copolymer was described by Burgess, *Manufacturing and Processing of PVC*, MacMillan, New York, 1982. A graft copolymer containing a mixture of E/VA copolymer and an ethylene-propylene copolymer is described in Chem. Abs. 97: 56,665, Aug. 23, 1982. A graft copolymer containing more than 25 percent of a terpolymer of ethylene, propylene, and a diene monomer is described in Chem. Abs. 98:35,550, Feb. 2, 1983. These examples are illustrative of methods for preparing rubber-modified vinyl chloride resins containing a high rubber content.

It should be understood that in a rubber-modified vinyl chloride resin, not all of the polyvinyl chloride chains are actually grafted to the rubber chains, as discussed in U.S. Pat. Nos. 3,812,204, 4,071,582, and 4,012,460. There may be a minor amount of ungrafted rubber, while the amount of polyvinyl chloride grafted to rubber chains usually will vary between about 0.5 and 2.0 times the amount of rubber present, depending on the amount and type of rubber present. When olefin rubbers are used, the amount of grafted polyvinyl chloride is greater for a terpolymer containing a diene monomer than for a saturated copolymer. References to grafted polyvinyl chloride obviously refer to such mixtures. Reference to other graft polymers, or rubber-modified polymers, in the present application also refers to mixtures of ungrafted copolymer or terpolymer chains, chains grafted to rubber, and ungrafted rubber.

Methods for the preparation of unmodified vinyl chloride resins which may be used in this inventin are well-known in the art and reported in the literature. See, for example, Kirk-Othmer, *Encyclopedia of Chemical Technology*, Third Edition, Volume 23, pages 900-936, 1981, John Wiley and Sons Inc., New York; European Patent Application No. 53,080 published Dec. 1, 1982; and Burgess, *Manufacture and Processing of PVC*, MacMillan, New York (1982). Many suitable resins are available commercially. Either or both vinyl chloride resins used in the blends of this invention may comprise a homopolymer of vinyl chloride, or a copolymer of vinyl chloride and up to about 20 percent by weight of a copolymerizable, ethylenically unsaturated comonomer such as ethylene, propylene, isobutylene or other alpha-olefin with 4 to 8 carbon atoms, vinyl acetate, vinyl stearate, vinylidene chloride, an alkyl acrylate, acrylic or methacrylic acid, methyl methacrylate, vinyl alkyl ethers in which the alkyl group contains 4 to 20 carbon atoms, and the like. In most instances, the amount of comonomer should be less than 10 percent because of the adverse effect on heat distortion temperature and rigidity. Most preferably, the comonomer is vinyl acetate, ethylene, propylene, isobutylene, or a vinyl alkyl ether, such as vinyl isobutyl ether.

The addition of various ratios of a rubber-modified vinyl chloride resin and an unmodified vinyl chloride resin to the blend provides independent control of the total amount of vinyl chloride resins in the blend and the amount of the dispersed phase of the graft copolymer of rubber and homopolymer or copolymer of vinyl chloride. Thus, a single rubber-modified vinyl chloride resin with optimum characteristics, such as molecular weight, rubber type and content, morphology, rheological properties, etc., can be used in a wide range of compositions while controlling the total amount of the graft copolymer phase added to the blend. The use of both types of vinyl chloride resins also provides a matrix which may contain two different vinyl chloride polymers. For example, one may be a homopolymer, while the other is a copolymer, while one may have a lower molecular weight than the other, or contain some low molecular weight plasticizer or other additives. The use of less than 10 percent of the unmodified resin is insufficient to have a significant effect on the properties of the blend, while the use of more than 70 percent (i.e. less than 30 percent of the rubber-modified resin) usually provides an insufficient amount of the graft copolymer phase in the polyblend, and thus a reduced impact strength.

The rubber-modified vinyl chloride resin and the unmodified vinyl chloride resin are used in the blends in ratios of 90:10 to 30:70. Although the percentage of grafted vinyl chloride homopolymer or copolymer in the rubber-modified resin may vary, a major amount of the polymerized vinyl chloride homopolymer or copolymer in the total amount of resin present in ungrafted.

A total of 80 to 20 percent by weight of the two vinyl chloride resins is intimately mixed with 20 to 80 weight percent of a polymer containing a vinyl aromatic monomer and an unsaturated dicarboxylic acid anhydride, in weight ratios of 95:5 to 70:30, optionally containing up to 25 percent (based on total monomers) of a termonomer selected from the group consisting of methyl methacrylate and an unsaturated nitrile such as acrylonitrile or methacrylonitrile. When acrylonitrile is used as termonomer, the maximum amount in the terpolymer generally is not greater than 20 percent.

The vinyl aromatic monomer which forms a part of the copolymer or terpolymer is preferably styrene or p-methylstyrene (vinyl toluene containing over 90 percent of p-methylstyrene) but may also include other nuclear methyl substituted styrenes, dimethylstyrenes, monochlorostyrenes (e.g. o- or p-chlorostyrene, or mixtures), alpha methyl-p-methylstyrene, 2-chloro-4-methylstyrene, tert-butylstyrenes, dichlorostyrenes, especially 2,4-dichlorostyrene, and the like. When alpha-methylstyrene, tert-butylstyrene, or dichlorostyrene is used, it is preferable to use a mixture with styrene or p-methylstyrene to form a terpolymer of maleic anhydride and two vinyl aromatic monomers. The preferred anhydride is maleic anhydride, although citraconic anhydride and itaconic anhydride or other anhydrides may also be suitable, while the preferred termonomers are methyl methacrylate and acrylonitrile.

Rubber-modified polymers are used in blends with rubber-modified vinyl chloride resins if a higher impact strength is required. These rubber-modified polymers contain 5 to 25 percent (based on total weight) of a rubber or a mixture of rubbers, and are prepared by copolymerizing the monomers in the presence of the rubber to form a dispersed phase, grafted with a portion of the polymer. The dispersed phase is usually in the form of discrete particles with average diameters in the range of 0.1 to 10 microns.

Suitable rubbers for use in the rubber-modified polymer are described in my co-pending application Ser.

No. 494,708. The preferred rubbers are butadiene-based, such as poly-1,3-butadiene, random copolymers containing 1,3-butadiene, and block copolymers of 1,3-butadiene and 10 to 55 percent (most preferably 20 to 50 percent) of a vinyl aromatic monomer, preferably styrene or p-methylstyrene. The block copolymers would include, but are not necessarily limited to, (a) linear diblock (or tapered block) copolymers such as the commercial rubbers Solprene 1205, Stereon 720, and Stereon 740; (b) radial copolymers such as Solprene 406, 411, and 414; (c) triblock copolymers such as Kraton 1101 and 1107; (d) hydrogenated block copolymers such as Kraton G; and (e) star-shaped copolymers containing up to 20 branches (styrene-butadiene branches, sometimes mixed with polybutadiene branches) (U.S. Pat. No. 4,010,226.) Various block copolymers are described in British Pat. No. 2,015,007. For applications where good light resistance is needed, it is desirable to use a rubber such as a hydrogenated styrene-butadiene block copolymer, a rubber based on an acrylate such as butyl acrylate, ethylene-propylene rubbers, epichlorohydrin rubber, and the like.

The maleic anhydride copolymers or terpolymers are known compositions, and are prepared by reacting a solution of rubber (when used), maleic anhydride, vinyl aromatic monomer, and optionally methyl methacrylate or an unsaturated nitrile, such as acrylonitrile, at elevated temperatures, usually in the presence of peroxide initiators. The resulting copolymers or terpolymers have a somewhat random distribution of monomer units along the polymer chains. Typically, the Melt Flow (condition L, grams/10 minutes) is between 0.1 and 10, and is somewhat dependent on the polymer composition, as well as the amount and type of rubber. My aforedescribed co-pending applications summarized various techniques for the preparation of both unmodified and modified copolymers and terpolymers containing maleic anhydride.

It is possible to mix additional ungrafted rubber, or a graft copolymer, or both together, into the blend in order to enhance impact strength or other properties. Any of the rubbers used in the preparation of the rubber-modified vinyl chloride resins or rubber modified anhydride polymer may be used in amounts up to about 15 percent based on the total weight of the blend. The preferred rubbers are the block copolymer rubbers containing 1,3-butadiene and a vinyl aromatic monomer, especially those containing 50 to 80 percent of 1,3-butadiene and 50 to 20 percent of styrene or p-methylstyrene; hydrogenated such block copolymers; chlorinated polyethylene; copolymers of ethylene and vinyl acetate or ethyl acrylate; and butyl acrylate-based rubbers.

Various graft copolymers may be added to the polyblends to enhance properties. Included are: (a) graft copolymers which serve primarily as an impact modifier, such as those which have a relatively high rubber content, e.g. 35 to 60 weight percent, and a relatively low proportion of ungrafted copolymer, e.g. 25 percent or less, so that most of the composition is incompatible with the polyblend matrix; and (b) thermoplastics which contain a lower rubber content and a high proportion of ungrafted copolymer, e.g. 25 to 50 percent or more, which is available for mixing with the polyblend matrix. Such thermoplastics may serve to improve compatibility of the matrix of the anhydride polymer and vinyl chloride resin. Some thermoplastics, especially those containing alpha-methylstyrene, may increase the softening temperature of the polyblend.

Suitable graft copolymers comprise a mixture of 20 to 70 percent of a vinyl aromatic monomer, preferably styrene or p-methylstyrene, and 80 to 30 percent of methyl methacrylate, based on weight of the monomers, polymerized in the presence of 10 to 60 percent of a substrate rubber. This type includes the well-known MBS impact modifiers which contain a butadiene-based rubber to which a high proportion of the copolymer is grafted. The MABS impact modifiers are similar, but contain up to about 25 percent of acrylonitrile, based on weight of the monomers.

Suitable MBS impact modifiers for use in this invention have been described in British Pat. No. 2,015,007 and U.S. Pat. No. 4,311,806. Graft copolymers containing lower amounts of rubber may be prepared by various conventional bulk, suspension, or latex processes.

Other suitable graft copolymers comprise a mixture of 60 to 80 percent of a vinyl aromatic monomer and 40 to 20 percent of an ethylenically unsaturated nitrile, particularly acrylonitrile or methacrylonitrile, polymerized in the presence of 10 to 60 percent of a substrate rubber, usually butadiene-based, as in various types of ABS resins. When acrylonitrile is used, the preferred amount is about 20 to 35 percent, based on weight of the monomers. The preferred amount for methacrylonitrile is about 25 to 40 percent. The preferred vinyl aromatic monomers are styrene, p-methylstyrene, and alpha-methylstyrene, or mixtures thereof. Particularly useful blends contain 10 to 50 percent, based on total weight of the blend of an ABS thermoplastic resin; together with the vinyl chloride resins and the unmodified or rubber-modified anhydride polymer in weight ratios of about 67:33 to 33:67. The ungrafted copolymer in a thermoplastic resin, particularly an ABS resin, may be formed concurrently with graft polymerization, or a portion may be formed separately by polymerization of the monomers in the absence of rubber. Suitable, ABS graft copolymers have been described in British Pat. No. 2,015,007 and U.S. Pat. Nos. 4,197,376, 4,305,869, 4,311,806, 3,642,949 and 3,626,033.

The graft copolymers containing an unsaturated nitrile may also contain other rubbers which give better light stability, such as chlorinated polyethylene, an alkyl acrylate-based rubber, (e.g. butyl acrylate-based), and a polyolefin-based rubber, e.g. a terpolymer of ethylene, propylene, and a small amount of an unconjugated diene. The use of such rubbers is generally known.

The polyblends of this invention normally exhibit relatively poor transparency because the refractive index of the dispersed graft copolymer phase does not match that of the matrix. It is, however, feasible to prepare blends which exhibit improved transparency, or which are substantially transparent.

The vinyl chloride resins and polymer may be blended, in the prescribed amounts, but mechanically working the components at a temperature high enough such that the mass is plasticized, e.g. by mixing on a two-roll mill, an internal mixer such as a Brabender or Banbury mixer, an extruder (a twin-screw extruder is sometimes preferred), or a Farrell mixer. In order to provide a homogenous blend, the mixing equipment should provide a high shear. In some cases, it may be necessary to plasticize first the component which has the highest melt viscosity and then add the other components in one or more increments. A batch mixer, or a continuous mixer with one or more side feed ports, might be used. When more than two components are blended, it may sometimes be desirable to prepare first a blend of two components.

The various vinyl chloride resins will exhibit different heat distortion temperatures, depending on the amount of comonomer, rubber, plasticizer, stabilizers and other additives used. Therefore, the heat distortion temperature of a blend will be dependent on the heat distortion temperatures of the vinyl chloride resin, as well as that of the polymer, and will be intermediate between those of the two components of the blend.

The following illustrates the types and amounts of the components used in the blended compositions of the present invention which will exhibit heat distortion temperatures significantly higher than those of the vinyl chloride resins used in the blends. All percent limitations in compositions of the present application are percent by weight. Heat distortion temperatures are measured according to ASTM test method D648 at 264 psi. using samples annealed at 50° C. If the samples are annealed at 70° C., the difference between the softening temperature of the blends and of the vinyl chloride resins will be significantly greater. (See U.S. Pat. No. 4,454,300 for test methods.)

As a first example, blends are prepared which contain 35 to 50 percent by weight of an unmodified copolymer of styrene and maleic anhydride in a ratio of about 85:15 and a total of 65 to 50 percent by weight of the following two vinyl chloride resins in a 40:60 ratio: (a) a rubber-modified homopolymer containing about 24 percent of a terpolymer of ethylene, propylene, and a diene monomer, and (b) an unmodified homopolymer of similar molecular weight. The blends will exhibit heat distortion temperatures which will vary between about 75° C. and about 82° C., compared with about 67° C. for a 40:60 blend of the two vinyl chloride resins. The use of copolymers containing about 20 percent of maleic anhydride, rather than 15 percent, will give heat distortion temperatures which will be slightly higher, e.g. between about 76° C. and 85° C. Replacement of half of the styrene with p-methylstyrene will give similar or slightly higher heat distortion temperatures.

As a second example, blends are prepared which contain 55 to 70 percent by weight of the unmodified copolymer of styrene and maleic anhydride in weight ratios of 85:15, used in first example, and a total of 45 to 30 percent by weight of the two vinyl chloride resins used in the first example, in a weight ratio of 50:50. The heat distortion temperatures of the blends will vary between about 85° C. and about 92° C. The use of a copolymer containing about 20 percent of maleic anhydride, rather than 15 percent, will give slightly higher heat distortion temperatures, e.g. between about 87° C. and about 95° C. The impact strength of such blends will be improved by the addition of about 10 percent, based on the weight of the blend, of a block copolymer of 1,3-butadiene and at least 20 percent of styrene, preferably blended with the copolymer prior to blending with the vinyl chloride resins.

As a third example, blends are prepared which contain 40 to 70 percent by weight of a rubber-modified copolymer of styrene and maleic anhydride in a ratio of about 85:15, containing about 10 percent of a block copolymer rubber of 80 percent 1,3-butadiene and 20 percent styrene, grafted with a portion of the copolymer, and 60 to 30 percent by weight of the two vinyl chloride resins used in the first example, in a weight ratio of 50:50. The heat distortion temperature of the blends will vary between about 73° C. and about 78° C. The use of a rubber-modified copolymer containing about 20 percent of maleic anhydride, rather than 15 percent, will give slightly higher heat distortion temperatures. The copolymer used in these blends may be replaced by a rubber-modified terpolymer containing styrene, maleic anhydride, and methyl methacrylate in a ratio of 71:14:15 to give equivalent, or slightly improved, properties.

As a fourth example, the third example is repeated, using the copolymers containing 15 or 20 percent of maleic anhydride; however, the unmodified vinyl chloride resin is a copolymer containing about 4 percent of propylene. The blends will have improved processability, compared with those in which the unmodified vinyl chloride resin is a homopolymer, and there is no significant reduction in the heat distortion temperatures. An unmodified copolymer containing about 10 percent of vinyl acetate may also be used. The heat distortion temperatures of the blends, although somewhat lower than those of the blends containing the propylene copolymer, are significantly higher than that of a 50:50 blend in which both vinyl chloride resins are homopolymers.

As a final example, a three-component blend is prepared containing the following: (a) 40 percent by weight of a rubber-modified terpolymer of styrene, maleic anhydride, and acrylonitrile in a weight ratio of 74:14:12; (b) 30 percent by weight of a 50:50 mixture of a rubber-modified vinyl chloride resin and an unmodified resin as used in the first example; and (c) 30 percent by weight of an ABS thermoplastic resin containing styrene and acrylonitrile in a weight ratio of 76:24 and about 17 percent of a butadiene-based rubber, in which about 50 percent of the copolymer of styrene and acrylonitrile is ungrafted. The blend will have a heat distortion temperature between about 80° C. and 85° C. or higher. A slightly higher heat distortion temperature will be obtained if at least 50 percent of the styrene in the ABS resin is replaced by alpha-methyl styrene.

The present compositions, blending a rubber-modified vinyl chloride resin, a vinyl chloride resin that is not rubber-modified, and a polymer of a vinyl aromatic monomer and an unsaturated dicarboxylic acid anhydride will thus provide blends having higher heat distortion temperatures.

What is claimed is:

1. A polyblend composition comprising:
   (a) 80 to 20 percent by weight of;
      (1) 90 to 30 percent by weight of a rubber-modified vinyl chloride resin, containing 0 to 20 percent, based on total monomers, of a copolymerizable, ethylenically unsaturated comonomer, said resin prepared by polymerization of vinyl chloride monomer and the comonomer in the presence of 15 to 50 percent, based on the weight of the resin, of a rubber to form a graft copolymer; and
      (2) 10 to 70 percent by weight of a vinyl chloride resin, containing 0 to 20 percent, based on total monomers, of a copolymerizable, ethylenically unsaturated comonomer, which is not rubber-modified;
   wherein a major amount of the polymerized vinyl chloride homopolymer or copolymer present in the total amount of (1) and (2) is ungrafted to the rubber of said rubber-modified vinyl chloride resin; and wherein said ethylenically unsaturated comonomer in (1) and (2) is selected from the group consisting of ethylene, propylene, an alpha-olefin containing 4 to 8 carbon atoms, vinyl acetate, vinyl stearate, a vinyl alkyl ether in which the alkyl group contains 4 to 20 carbon atoms, vinylidene chloride, alkyl acrylate, acrylic acid, methacrylic acid and methyl methacrylate; and (b) 20 to 80 percent by weight of a polymer of a vinyl aromatic monomer and an unsaturated dicarboxylic acid anhydride monomer in weight ratios of 95:5 to 70:30, and 0 to 25 percent, based on total monomers, of a copolymerizable, ethylenically unsaturated termonomer, selected from the group consisting of methyl methacrylate, acrylonitrile, and methacrylonitrile.

2. A polyblend composition as defined in claim 1 wherein the rubber used in the preparation of the rubber-modified vinyl chloride resin is selected from the group consisting of a copolymer of ethylene and a polymerizable comonomer selected from the group consisting of vinyl acetate, ethyl acrylate, methyl acrylate, propylene and butene-1, a terpolymer of ethylene, propylene and a diene monomer, chlorinated polyethylene, a butyl acrylate-based rubber and a block copolymer of a vinyl aromatic monomer and butadiene.

3. A polyblend composition as defined in claim 1 wherein there is added up to 15 percent of an ungrafted rubber selected from the group consisting of block copolymer rubbers containing 1,3-butadiene and a vinyl aromatic monomer, hydrogenated said block copolymers; chlorinated polyethylene, copolymers of ethylene and vinyl acetate, copolymers of ethylene and ethyl acrylate, and butyl acrylate-based rubbers.

4. The polyblend composition as defined in claim 1 wherein there is added up to 50 percent by weight, based on the weight of the polyblend, of a graft copolymer selected from the group consisting of (a) a copolymer of 30 to 80 percent by weight of methyl methacrylate, and 70 to 20 percent by weight of a vinyl aromatic monomer, (b) a copolymer of 20 to 40 percent acrylonitrile and 80 to 60 percent by weight of a vinyl aromatic monomer, and (c) a copolymer of 20 to 40 percent methacrylonitrile and 80 to 60 percent by weight of a vinyl aromatic monomer; said copolymer being grafted onto 10 to 60 percent based on the weight of the graft copolymer, of a substrate rubber.

5. The polyblend composition as defined in claim 1 wherein at least one of said rubber-modified vinyl chloride resin and said vinyl chloride resin is a copolymer of vinyl chloride and an ethylenically unsaturated comonomer selected from the group consisting of ethylene, propylene, isobutylene and vinyl acetate.

6. The polyblend composition as defined in claim 1 wherein said vinyl aromatic monomer is selected from the group consisting of styrene and p-methylstyrene.

7. The polyblend composition as defined in claim 6 wherein said unsaturated dicarboxylic acid anhydride is maleic anhydride, and is present in said polymer in an amount of 10 to 25 percent by weight of said polymer.

8. The polyblend composition as defined in claim 7 wherein said polymer contains up to 25 percent methyl methacrylate.

9. The polyblend composition as defined in claim 7 wherein said polymer contains up to 20 percent acrylonitrile.

10. The polyblend composition of claim 1 wherein said polymer of a vinyl aromatic monomer and an unsaturated dicarboxylic acid anhydride monomer is a rubber-modified polymer prepared by polymerization of said monomers, and the termonomer, in the presence of 5 to 25 percent, based on the weight of the rubber-modified polymer, of a rubber to form a graft copolymer.

11. A polyblend composition as defined in claim 10 wherein the rubber used in the preparation of the rubber-modified vinyl chloride resin is selected from the group consisting of a copolymer of ethylene and a polymerizable comonomer selected from the group consisting of vinyl acetate, ethyl acrylate, methyl acrylate, propylene and butene-1, a terpolymer of ethylene propylene and a diene monomer, chlorinated polyethylene, a butyl acrylate-based rubber and a block copolymer of a vinyl aromatic monomer and butadiene.

12. A polyblend composition as defined in claim 10 wherein there is added up to 15 percent of an ungrafted rubber selected from the group consisting of block copolymer rubbers containing 1,3-butadiene and a vinyl aromatic monomer, hydrogenated said block copolymers; chlorinated polyethylene, copolymers of ethylene and vinyl acetate, copolymers of ethylene and ethyl acrylate, and butyl acrylate-based rubbers.

13. The polyblend composition as defined in claim 10 wherein there is added up to 50 percent by weight, based on the weight of the polyblend, of a graft copolymer selected from the group consisting of (a) a copolymer of 30 to 80 percent by weight of methyl methacrylate and 70 to 20 percent by weight of a vinyl aromatic monomer, (b) a copolymer of 20 to 40 percent acrylonitrile and 80 to 60 percent by weight of a vinyl aromatic monomer, and (c) a copolymer of 20 to 40 percent methyacrylonitrile and 80 to 60 percent by weight of a vinyl aromatic monomer; said copolymer being grafted onto 10 to 60 percent based on the weight of the graft copolymer, of a substrate rubber.

14. The polyblend composition as defined in claim 10 wherein at least one of said rubber-modified vinyl chloride resin and said vinyl chloride resin is a copolymer of vinyl chloride and an ethylenically unsaturated comonomer selected from the group consisting of ethylene, propylene, isobutylene and vinyl acetate.

15. The polyblend composition as defined in claim 10 wherein said vinyl aromatic monomer is selected from the group consisting of styrene and p-methylstyrene.

16. The polyblend composition as defined in claim 15 wherein said unsaturated dicarboxylic acid anhydride is maleic anhydride, and is present in said polymer in an amount of 10 to 25 percent by weight of said polymer.

17. The polyblend composition as defined in claim 16 wherein the rubber in said rubber-modified polymer is selected from the group consisting of polybutadiene and a block copolymer of 90 to 45 percent 1,3-butadiene and 10 to 55 percent of a vinyl aromatic monomer selected from the group consisting of styrene and p-methylstyrene.

18. The polyblend composition as defined in claim 17 wherein said polymer contains up to 25 percent methyl methacrylate.

19. The polyblend composition as defined in claim 17 wherein said polymer contains up to 20 percent acrylonitrile.

* * * * *